2 Sheets—Sheet 1.
G. K. SNOW.
Die for Making Collars.
No. 8,046. Reissued Jan. 22, 1878.
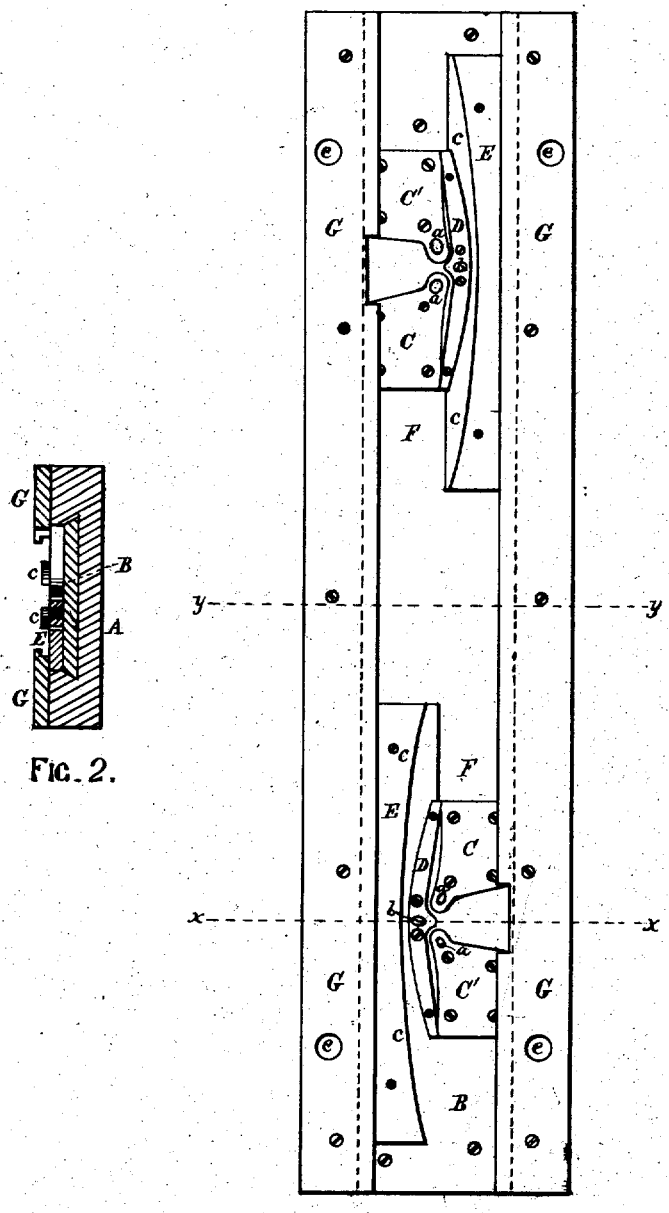
FIG. 1.
FIG. 2.
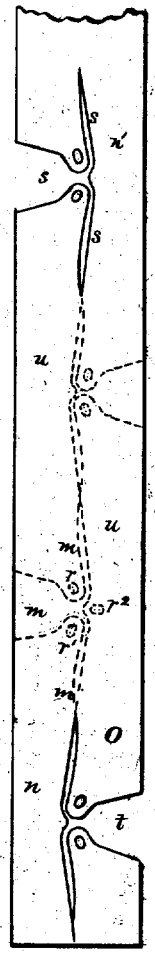
FIG. 6.
WITNESSES.
E. A. Hemmenway
N. C. Lombard.
INVENTOR.
Geo. K. Snow

G. K. SNOW.

Die for Making Collars.

No. 8,046. Reissued Jan. 22, 1878.

WITNESSES.

E. A. Hemmenway.

N. C. Lombard.

INVENTOR.

Geo. K. Snow.

UNITED STATES PATENT OFFICE.

GEORGE K. SNOW, OF WATERTOWN, MASSACHUSETTS.

IMPROVEMENT IN DIES FOR MAKING COLLARS.

Specification forming part of Letters Patent No. 132,546, dated October 29, 1872; Reissue No. 8,046, dated January 22, 1878; application filed November 20, 1877.

*To all whom it may concern:*

Be it known that I, GEORGE K. SNOW, of Watertown, in the county of Middlesex and State of Massachusetts, have invented certain new and useful Improvements in Dies for Making Collars, of which the following is a specification:

The object of my invention is the application of dies to the process of cutting collars from a strip of material having parallel edges, and of a width but little in excess of the sum of the greatest and least widths of the collars to be produced, arranged and operating in such a manner that at each downward movement of the cross-head each pair of dies shall shape the contiguous ends of two collars and about one-fourth part of the length of the bottom edge of the same collars, and about one-half the length of the bottom edge of another collar, said half-length cut being the middle portion of the latter collar, and also at the same movement of the cross-head to punch the end button-holes in the two collars whose ends are being shaped and the middle button-hole in the contiguous collar whose middle is being shaped by said movement.

Two sets of dies are used, arranged to cut one upon either edge of the strip of material, and each die cutting out the waste between the contiguous ends of two collars, and also cutting between the contiguous bottom or top edges of a portion of three collars a distance equal to at least half the length of the longest collar. The same movement of the cross-head also embosses the imitation stitching on two collars and the line of fold on two others. The distance between the centers of the two pairs of cutting-dies is a distance a little greater than the length of a collar and a half, and as the material is fed forward a distance equal to the length of a collar, it follows that after the third or fourth stroke two collars will be completed at each stroke of the cross-head.

This specification illustrates one mode of taking advantage of the circumstance of the middle of a collar being narrower than the ends, in order to make a saving in material, as described in my Patent No. 132,547, October 29, 1872, for improvements in the manufacture of collars; and although I waste a piece of stock between the bottoms of two collars, I still make a great saving, as compared with the present mode of cutting collars.

Figure 5:
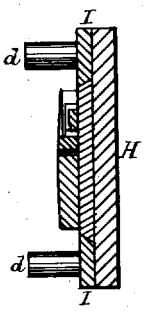
Figure 3:
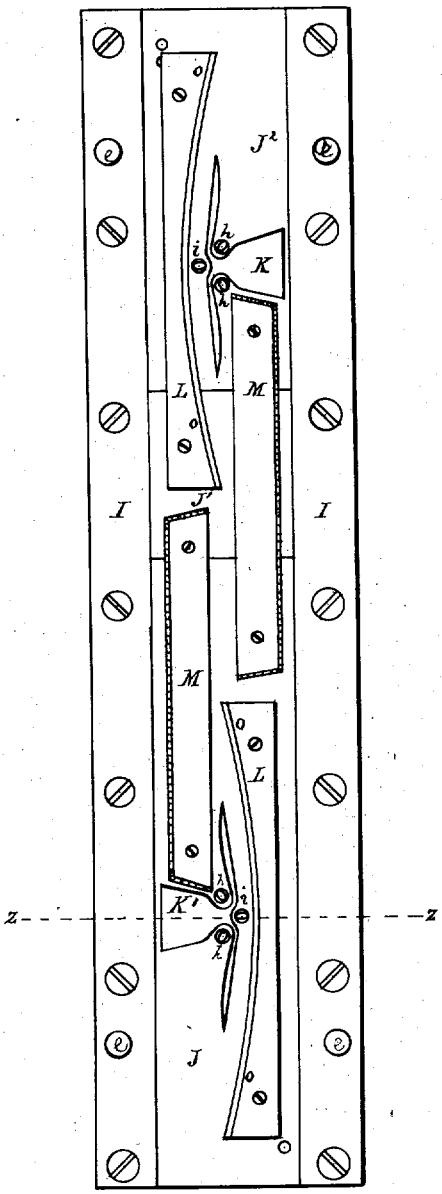
Figure 4:
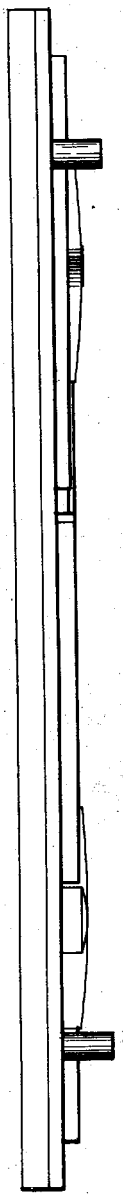

Figure 1 is a plan of the lower or bed dies. Fig. 2 is a section on line *x x* on Fig. 1. Fig. 3 is a plan of the under side of the upper or movable die. Fig. 4 is an edge view of the same, and Fig. 5 is a transverse section on line *z z* on Fig. 3. Fig. 6 is a plan of a strip of material in process of being cut into collars.

A is the bed-plate of the lower or female die, having a dovetailed groove planed or otherwise formed therein to receive the plate B, to which are secured the most of the parts which constitute the female cutting-die and the lower embossing-dies. The female cutting-die is made up of several pieces of steel plate, as C and C′, which are the reverse center parts of each other, each being shaped like the ends of the collar that is to be cut, and having formed therein the female die *a*, for cutting the end button-holes. D is another steel plate, one edge of which is shaped to the form of the middle portion of the lower edge of the collar, and having formed therein the female die *b*, for cutting the middle button-hole. E is a plate, one edge of which is curved to the proper shape, and provided with a blunt knife-edge or male die, *c*, for embossing the line of fold upon a collar, said die being of a length equal to the length of the longest collar. F is a plate of even thickness with the plates C, and made to fill the space between the plates C and E of the two dies, and form a surface upon which the imitation stitching is embossed. G G are plates of metal, secured by screws or otherwise to the bed-plate A, in a position parallel to each other, the lower corner of the inner edges being cut away, so as to form grooves to guide the paper while being fed through the machine.

The plates B extend toward each other a distance equal to three-fourths the length of the shortest collar, and are adjustable toward or from each other, a filling-piece being placed between them of suitable length to locate the cutting-dies at the proper distance apart to cut the desired collar. The bed-plate A is secured firmly to the bed of the machine.

H is the bed-plate of the upper die, and is secured firmly to the cross-head of the press in which it is to be used, in any suitable manner, directly over the lower die, in such a position that the pins *d* will fit into the holes *e* in the lower die. I I are guide-plates, secured to the bed-plate H by screws or otherwise, and having their inner edges beveled, so as to form a dovetailed groove, into which are fitted the plates J, $J^1$, and $J^2$, upon which are secured the several parts of the cutting and embossing dies. K and K′ are the male cutting-punches, which cut out the waste stock between the ends of two contiguous collars, and shape the middle portion of the lower edge of one collar and the end portions of the lower edges of two other collars. *h h* are the male punches, which work in conjunction with the female dies *a a* to cut the end button-holes, and *i i* are corresponding dies to work with the female die *b* to cut the middle button-holes. L L are plates having one edge curved, and also having a curved groove, *o*, formed in the face thereof, which, working with the male die *c*, embosses a curved line upon the collar to determine the fold. M M are the male stitching-dies, so arranged as to emboss the stitching on two collars at every downward movement of the upper die.

The male cutting-dies may be adjusted with relation to each other by removing the plate $J^1$ and substituting for it another one of greater or less length, according to the size of the collar to be made. The stitch-embossing dies M and F have to be changed for every different size of collar made, and the fold embossing dies have to be changed about every third size. The form of the dies may be so changed as to cut between the ends of two contiguous collars and the top edges of portions of three collars, instead of cutting between the bottom edges, as above described, if it is desirable to cut a collar having a curved top edge.

It is evident that the strip of material may be fed automatically to the dies by providing a means of discharging the collars after they are cut. Openings should be made in the bed-plate A, immediately under the female dies, to allow the waste which is punched out to fall through, said opening not being shown in the drawing.

The operation of cutting collars and embossing the same by this process is as follows: The material is first cut into strips of even width, having straight parallel edges, and then said strips are fed endwise between the cutting and embossing dies, the edges of said strip being guided by the grooves formed in the under side of the plates G G, the forward end of the strip being placed at the dotted line *y y*, when the cross-head carrying the upper die descends, and the right-hand die will punch out the waste indicated at *m* in dotted lines, the imitation stitching will be embossed on the part of a collar marked *n*, and the fold-line will be embossed on the collar marked *o*, and the three button-holes marked $r\ r^1\ r^2$ are cut. When the cross-head rises the material is fed forward to the left a distance equal to the length of a collar, when the cross-head again descends and the right-hand die cuts out the waste indicated by full lines at *s*, Fig. 6, and the left-hand die cuts out the waste indicated in full lines at *t*. The imitation stitching is embossed on the collars *n* and *o*, and the line of fold embossed on the collars *n* and $n^1$, and each set of dies will cut two end button-holes and one center button-hole, and the two parts of collars *n* and $n^2$ will be severed from the strip.

The operations above described being repeated, two collars will be severed, two will have imitation stitching embossed thereon, and two lines of fold will be embossed on two other collars. In other words, two collars will be completed at each downward stroke of the cross-head, portions of the work being done upon six collars at the same time. The same work may be done with a single pair of dies by feeding the strip of material through twice, the material being turned around, so as to cause the dies to act upon the other edge thereof.

By means of this arrangement one cutting-die may be made to shape all the different sizes of collars of a given style without change or adjustment thereof.

What I claim as new, and desire to secure by Letters Patent of the United States, is—

1. A cutting-die so constructed and operating as to shape the contiguous ends of two collars, and at the same time shape about one-fourth part of the length of one edge of each of said two collars and about one-half the length of one edge of another collar, the middle of which is opposite to the ends of the two collars first named, substantially as described.

2. In combination with a cutting-die arranged to shape the contiguous ends of two collars and the middle portion of a third, button-hole dies so arranged and working therewith as to cut two end button-holes and one center button-hole, each in separate collars, substantially as described.

3. In combination with a cutting-die arranged to shape the contiguous ends of two collars and the middle portion of a third, a stitch-embossing die so arranged in connection therewith as to emboss an imitation stitch on one of said collars, substantially as described.

4. In combination with a cutting-die arranged to shape the contiguous ends of two collars and the middle portion of a third collar, a pair of embossing-dies so arranged in connection therewith that the same movement which shapes portions of three collars shall emboss the line of fold on one of said collars, substantially as described.

5. The combination of the shaping-dies K K′, button-hole dies *i i h h h h*, stitch-embossing dies M M, and creasing-dies L L in the cross-head, and corresponding female dies and resisting-surfaces in the bed-plate, for the purpose specified.

6. The combination of two sets of cutting and embossing dies, constructed, arranged, and operating substantially as herein described, for the purpose specified.

7. The above-described process of cutting collars, by first cutting the material into strips of even width, having straight parallel edges, and suitable for two rows of collars, and then feeding the said strips endwise to the action of dies, which cut between the contiguous ends and the contiguous sides of collars, so that two collars are cut from the strip at each movement of the machine, substantially as described.

8. The above-described process of embossing collars, by first cutting the material into strips of even width, having straight parallel edges, and then feeding the said strips to the action of dies, which emboss the lines of stitching upon two collars, one in each row, at each movement of the machine, substantially as described.

GEO. K. SNOW.

Witnesses:
E. A. HEMMENWAY,
N. C. LOMBARD.